United States Patent
Kado et al.

(10) Patent No.: US 11,908,427 B2
(45) Date of Patent: Feb. 20, 2024

(54) DISPLAY DEVICE AND DISPLAY METHOD

(71) Applicant: Panasonic Intellectual Property Management Co., Ltd., Osaka (JP)

(72) Inventors: Hiroyuki Kado, Osaka (JP); Hiroshi Mitani, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 18/089,809

(22) Filed: Dec. 28, 2022

(65) Prior Publication Data

US 2023/0142486 A1 May 11, 2023

Related U.S. Application Data

(63) Continuation of application No. PCT/JP2021/008231, filed on Mar. 3, 2021.

(30) Foreign Application Priority Data

Jul. 6, 2020 (JP) .................. 2020-116579

(51) Int. Cl.
*G09G 5/10* (2006.01)
*G09G 3/36* (2006.01)

(52) U.S. Cl.
CPC ......... *G09G 3/3607* (2013.01); *G09G 3/3696* (2013.01); *G09G 2300/0452* (2013.01); *G09G 2320/029* (2013.01); *G09G 2320/0242* (2013.01); *G09G 2320/064* (2013.01)

(58) Field of Classification Search
CPC .............. G09G 3/3607; G09G 3/3696; G09G 2300/0452; G09G 2320/0242; G09G 2320/029; G09G 2320/064

USPC ........................................ 345/690
See application file for complete search history.

(56) References Cited

U.S. PATENT DOCUMENTS

| 2009/0002297 A1 | 1/2009 | Sakai et al. |
| 2011/0037924 A1 | 2/2011 | Kido |
| 2012/0293741 A1* | 11/2012 | Gu .................. G09G 3/36 349/190 |

(Continued)

FOREIGN PATENT DOCUMENTS

| JP | 2005-062718 | 3/2005 |
| JP | 2007-192919 | 8/2007 |

(Continued)

OTHER PUBLICATIONS

International Search Report dated May 18, 2021, in International (PCT) Application No. PCT/JP2021/008231, with English translation.

*Primary Examiner* — Jennifer T Nguyen
(74) *Attorney, Agent, or Firm* — WENDEROTH, LIND & PONACK, L.L.P.

(57) ABSTRACT

This display device includes n number of liquid crystal displays, where n is an integer of 2 or more, light sources that can emit light of a plurality of different colors and that are provided to the respective liquid crystal displays, and a processor that causes the light sources to emit light of different colors so as to vary emission start timings for the respective light sources provided to the liquid crystal displays on the basis of input signals including color information regarding sub display images to be displayed on the respective liquid crystal displays.

11 Claims, 5 Drawing Sheets

(56) References Cited

U.S. PATENT DOCUMENTS

| | | | |
|---|---|---|---|
| 2013/0063496 A1 | 3/2013 | Basler et al. | |
| 2014/0078271 A1 | 3/2014 | Oda | |
| 2014/0233261 A1 | 8/2014 | Moriwaki et al. | |
| 2016/0097931 A1* | 4/2016 | Takahota | G02B 27/0172 345/690 |
| 2016/0116768 A1* | 4/2016 | Okuyama | G02F 1/1334 349/33 |
| 2019/0004595 A1* | 1/2019 | Mizuno | G06F 1/32 |

FOREIGN PATENT DOCUMENTS

| | | |
|---|---|---|
| JP | 2008-020758 | 1/2008 |
| JP | 2010-177979 | 8/2010 |
| JP | 2011-039305 | 2/2011 |
| JP | 2014-077985 | 5/2014 |
| JP | 2019-028081 | 2/2019 |
| WO | 2013/046604 | 4/2013 |

* cited by examiner

DISPLAY DEVICE AND DISPLAY METHOD

CROSS-REFERENCE TO RELATED APPLICATIONS

This is a continuation of International Application No. PCT/JP2021/008231 filed on Mar. 3, 2021, and claims priority from Japanese Patent Application No. 2020-116579 filed on Jul. 6, 2020, the entire content of which is incorporated herein by reference.

TECHNICAL FIELD

The present disclosure relates to a display device and a display method.

BACKGROUND ART

Patent Literature 1 discloses a field sequential liquid crystal display device. The field sequential liquid crystal display device includes a liquid crystal panel and a backlight including a plurality of light emitting elements that emit light of different colors. In the liquid crystal display device, a plurality of light emitting elements of colors corresponding to respective fields are turned on in a plurality of field periods of each frame period, and a subfield period in which a plurality of light emitting elements corresponding to colors other than those of the turned-on light emitting elements are sequentially turned on is provided at least once in at least one field period of the plurality of field periods.

CITATION LIST PATENT LITERATURE

Patent Literature1: JP2008-20758A

SUMMARY OF INVENTION

The present disclosure has been proposed in view of the above circumstances, and an object thereof is to provide a display device and a display method capable of reducing color breakup of a display image displayed using a field sequential color system.
Solution to Problem
The present disclosure provides a display device including: n number of liquid crystal displays, where n is an integer equal to or greater than 2; a light source that is provided for each liquid crystal display and is capable of emitting light of a plurality of different colors; and a processor that causes each light source to emit light of different colors based on an input signal including color information on a sub display image to be displayed on each liquid crystal display such that light emission start timings of the light sources provided for the liquid crystal displays are different from each other.

Further, the present disclosure provides a display method including: acquiring an input signal including color information on a sub display image to be individually displayed on n number of liquid crystal displays, where n is an integer equal to or greater than 2; and causing a light source, which is provided for each liquid crystal display and is capable of emitting light of a plurality of different colors, to emit light of different colors based on the color information such that light emission start timings of the light sources provided for the liquid crystal displays are different from each other.

According to the present disclosure, it is possible to reduce color breakup of a display image displayed using a field sequential color system.

DESCRIPTION OF EMBODIMENTS

Background of the Present Disclosure

Figure 1:
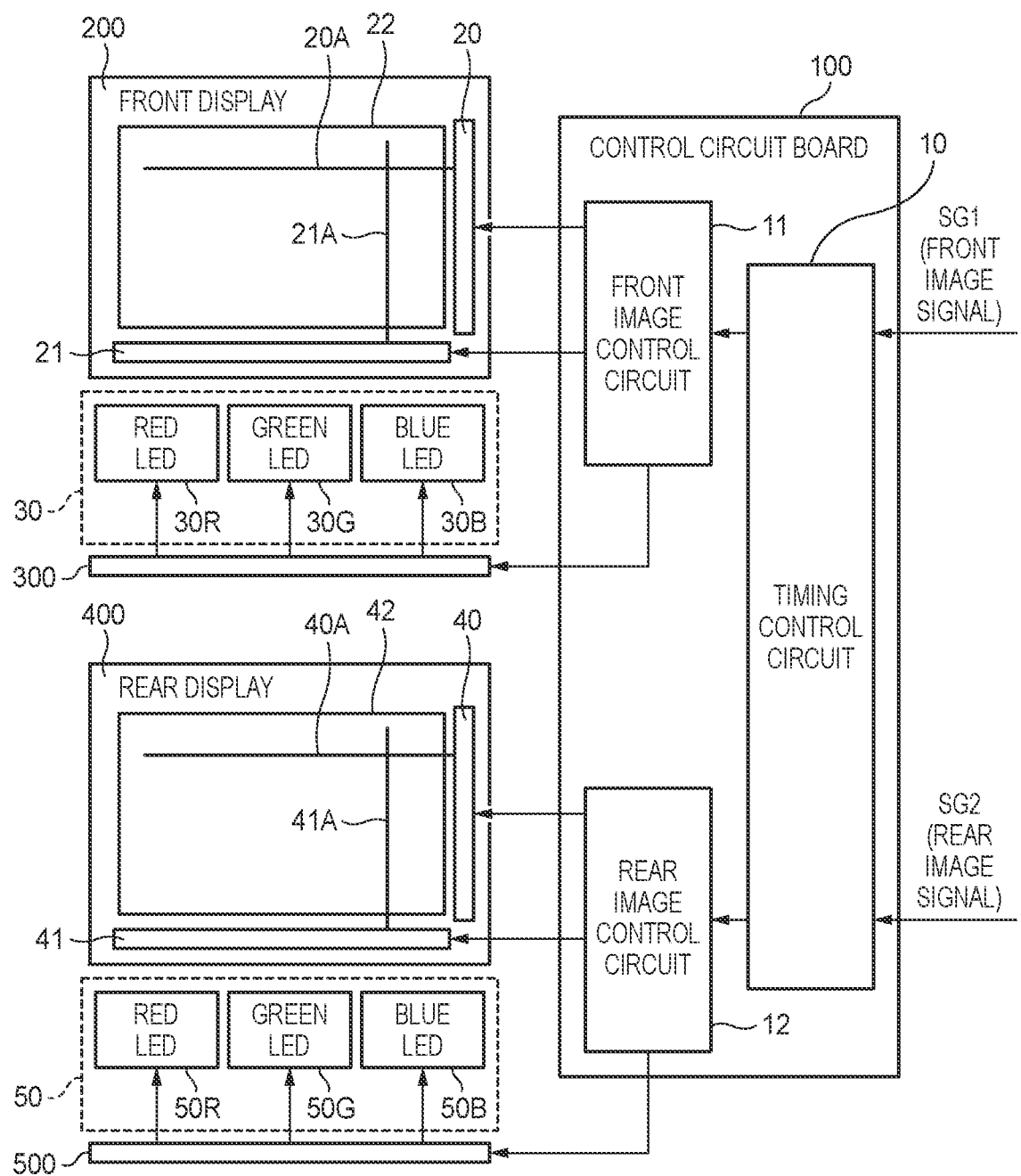
FIG. 1 is a diagram illustrating a structure example of a main part of a display device according to an embodiment.

Patent Literature 1 discloses a liquid crystal display device using a field sequential color (FSC) system. In the liquid crystal display device, a red LED, a green LED, and a blue LED are arranged at a rear surface of a liquid crystal panel, and an achromatic color (white or gray) field for simultaneously turning on the red LED, the green LED, and the blue LED in each of a plurality of field periods obtained by dividing one frame is provided, thereby further preventing color breakup of a display image.

However, in the liquid crystal display device, even if an achromatic color (white or gray) is superimposed on a single color (red, green, or blue), the effect of reducing color breakup may be poor. In addition, in order to cause the LED of another color to emit light in a field period in which a display image of a corresponding color is written, the color purity may be reduced.

The color breakup occurs when, in a display image in which LEDs of a plurality of colors are sequentially turned on in a field sequential color system, it is displayed that a viewer's point of view or a liquid crystal display is moving. The color breakup is a phenomenon in which a display image (color) visually recognized by a viewer is remained as an afterimage, and a display image (color) displayed before is seen separately when a next different display image (color) is displayed. The color breakup can be reduced by increasing a refresh rate of a liquid crystal display. But due to a limit in reduction of response time of liquid crystal, there is a limit in increase of the refresh rate.

Therefore, in the following embodiment, an example of a display device and a display method capable of reducing color breakup of a display image by using a plurality of liquid crystal displays using a field sequential color system will be described.

Hereinafter, an embodiment specifically disclosing configurations and operations of a display device and a display method according to the present disclosure will be described in detail with reference to the drawings as appropriate. An unnecessarily detailed description may be omitted. For example, a detailed description of well-known matters and a repeated description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matters described in the claims.

In addition, a display image displayed by the display device according to the present embodiment will be described. The display device allows a viewer to see one single display image obtained by superimposing display images (hereinafter, referred to as "sub display images") displayed by a plurality of liquid crystal displays respectively. Accordingly, the viewer can visually recognize the display image as a stereoscopic image. However, in the display device, for example, in a case where the same sub display images are displayed on a plurality of liquid crystal displays respectively, a display image obtained after the sub display images are superimposed may not be a stereoscopic image. Therefore, the display device according to the present embodiment described below is not limited to a configuration and an operation of displaying a stereoscopic image, and is not excluded to have a configuration and an operation of displaying a display image that is not a stereoscopic image.

A structure of the display device according to the embodiment will be described with reference to FIG. 1. FIG. 1 is a diagram illustrating a structure example of a main part of the display device according to the embodiment. The display device according to the embodiment includes a plurality of liquid crystal displays, displays sub display images on the plurality of liquid crystal displays respectively, and allows a viewer to see a display image (stereoscopic image) obtained by superimposing the sub display images. Although the example of the display device illustrated in FIG. 1 includes two liquid crystal displays (liquid crystal panels), the number of liquid crystal displays (liquid crystal panels) is not limited to two, and may be three or more, for example.

The display device includes a control circuit board 100, a front display 200, a rear display 400, LED drive circuits 300 and 500, and light sources 30 and 50. A liquid crystal drive system for each of the plurality of liquid crystal displays provided in the display device according to the embodiment is an FSC system.

The control circuit board 100 as an example of a processor is configured by using, for example, a central processing unit (CPU) or a field programmable gate array (FPGA), and performs various types of processing and control in cooperation with a memory (not illustrated). Specifically, the control circuit board 100 refers to a program and data stored in the memory, and executes the program, thereby implementing a function of controlling a sub display image displayed on the front display 200 based on a front image signal SG1 and a function of controlling a sub display image displayed on the rear display 400 based on a rear image signal SG2.

The control circuit board 100 receives an input of the front image signal SG1 as an example of an input signal including at least color information and luminance information displayed in each of all pixels provided in the front display 200, and an input of the rear image signal SG2 as an example of an input signal including at least color information and luminance information displayed in each of all pixels provided in the rear display 400. The control circuit board 100 generates, based on the input front image signal SG1, a control signal for controlling a sub display image displayed on the front display 200, and outputs the control signal to a scanning line drive circuit 20, a video line drive circuit 21, and the LED drive circuit 300. The control circuit board 100 generates, based on the input rear image signal SG2, a control signal for controlling a sub display image displayed on the rear display 400, and outputs the control signal to a scanning line drive circuit 40, a video line drive circuit 41, and the LED drive circuit 500. The control circuit board 100 includes a timing control circuit a front image control circuit 11, and a rear image control circuit 12.

The timing control circuit 10 is a so-called delay circuit, and performs control so that a timing at which the front image signal SG1 is input to the front image control circuit 11 and a timing at which the rear image signal SG2 is input to the rear image control circuit 12 are shifted from each other. In the display device according to the embodiment, an example will be described in which the timing control circuit 10 performs control to delay the timing, at which the rear image signal SG2 is input to the rear image control circuit 12, by a predetermined time with reference to the timing at which the front image signal SG1 is input to the front image control circuit 11. Further, in such a case, the timing control circuit 10 illustrated in FIG. 1 may be provided only on an image control circuit side (that is, a rear image control circuit 12 side) on which the input of the image signal is delayed.

First, when the front image signal SG1 and the rear image signal SG2 are input, the timing control circuit 10 outputs the front image signal SG1 to the front image control circuit 11. The timing control circuit 10 outputs the rear image signal SG2 to the rear image control circuit 12 at a timing after elapse of a predetermined time from a timing at which the front image signal SG1 is output to the front image control circuit 11. Here, the predetermined time is an example of a display preparation period, and is a time (that is, a writing time) elapsed until an alignment direction of liquid crystal molecules of polymer dispersed liquid crystal (PDLC) in a region corresponding to a predetermined pixel on the front display 200 side is reset (refreshed) by the front image control circuit 11 and the alignment direction of the liquid crystal molecules is changed. The PDLC has a structure in which a layer in which a liquid crystal material is dispersed in a transparent polymer material is sandwiched between two sheets of glass arranged in a manner of facing each other. The liquid crystal material contains liquid crystal molecules having electro-optical characteristics, and an alignment direction of the liquid crystal molecules changes due to application of a voltage. In the PDLC provided in the front panel 22, the alignment direction of the liquid crystal molecules is reset (refreshed) or changed by the front image control circuit 11. In the PDLC provided in the rear panel 42, the alignment direction of the liquid crystal molecules is reset (refreshed) or changed by the rear image control circuit 12.

Furthermore, when the display device includes a front display, an intermediate display, and a rear display as three liquid crystal displays, the timing control circuit 10 controls timings at which input signals are input to three control circuits respectively. Each control circuit executes control of corresponding drive circuits (a scanning line drive circuit, a video line drive circuit, and an LED drive circuit) that drive a corresponding one of the three liquid crystal displays.

Specifically, when the timing control circuit 10 receives an input of three image signals corresponding to the displays, the timing control circuit 10 inputs an image signal for the front display to the control circuit for the front display. After elapse of a first predetermined time from the timing at which the image signal for the front display is input to the control circuit for the front display, the timing control circuit 10 inputs an image signal for the intermediate display to the control circuit for the intermediate display. After elapse of a second predetermined time from the timing at which the image signal for the intermediate display is input to the control circuit for the intermediate display, the timing control circuit 10 inputs an image signal for the rear display to the control circuit for the rear display. The first predetermined time and the second predetermined time may be set to different times as long as the first predetermined time and the second predetermined time are times within a writing time of the LED drive circuit of the front display. The same applies to a case where the display device includes four or more liquid crystal displays.

Based on the input front image signal SG1, the front image control circuit 11 generates control signals for controlling the scanning line drive circuit 20, the video line drive circuit 21, and the LED drive circuit 300 (hereinafter referred to as "front-side drive circuits") respectively.

Based on the luminance information included in the front image signal SG1, the front image control circuit 11 generates a control signal for controlling scanning lines 20A provided on the front panel 22 and a control signal for controlling video lines 21A provided on the front panel 22. Based on the color information included in the front image signal SG1, the front image control circuit 11 generates a control signal for driving the LED drive circuit 300. Each of the control signals generated by the front image control circuit 11 includes a timing signal (that is, a synchronization signal) by which the scanning line drive circuit 20, the video line drive circuit 21, and the LED drive circuit 300 can be driven in synchronization with each other. The front image control circuit 11 outputs the generated control signals to the front-side drive circuits.

The control signal for controlling the scanning lines 20A is generated including information on a voltage value applied to the scanning lines 20A. The control signal for controlling the video lines 21A is generated including information on a voltage value applied to the video lines 21A. The control signal for driving the LED drive circuit 300 is generated including information on the LEDs to be turned on.

Based on the input rear image signal SG2, the rear image control circuit 12 generates control signals for controlling the scanning line drive circuit 40, the video line drive circuit 41, and the LED drive circuit 500 (hereinafter referred to as "rear-side drive circuits") respectively.

Based on the luminance information included in the rear image signal SG2, the rear image control circuit 12 generates a control signal for controlling each of scanning lines 40A provided on the rear panel 42 and a control signal for controlling each of video lines 41A provided on the rear panel 42. Based on the color information included in the rear image signal SG2, the rear image control circuit 12 generates a control signal for driving the LED drive circuit 500. Each of the control signals generated by the rear image control circuit 12 includes a timing signal (that is, a synchronization signal) by which the scanning line drive circuit 40, the video line drive circuit 41, and the LED drive circuit 500 can be driven in synchronization with each other. The rear image control circuit 12 outputs the generated control signals to the rear-side drive circuits.

Also, the control signal for controlling each of the scanning lines 40A is generated including information on a voltage value applied to the scanning lines 40A. The control signal for controlling each of the video lines 41A is generated including information on a voltage value applied to the video lines 41A. The control signal for driving the LED drive circuit 500 is generated including information on the LEDs to be turned on.

Here, the voltage values applied to the scanning lines 40A and the video lines 41A are set to be larger than the voltage values applied to the scanning lines 20A and the video line 21A provided in the front display 200 when the rear display 400 displays a sub display image having the same luminance as that of the front display 200. Accordingly, in the rear display 400, a difference between luminance, which a sub display image displayed by the rear display 400 has after transmitting through the front display 200, and luminance of a sub display image displayed by the front display 200 can be adjusted to be small.

The voltage values applied to the scanning lines 40A and the video lines 41A may be set to a value obtained by multiplying the voltage values applied to the scanning lines 20A and the video lines 21A or the luminance indicated by the rear image signal SG2 by a predetermined magnification (for example, 1.2 times, 1.5 times, or the like of the voltage values applied to the scanning lines 20A and the video lines 21A) based on a transmittance of the front display 200. When a plurality of liquid crystal displays are arranged at a front side (viewer side) of the rear display 400, the voltage values applied to the scanning lines 40A and the video lines 41A may be set to a value obtained by multiplying the luminance indicated by the rear image signal SG2 by a predetermined magnification based on a transmittance of each of the plurality of liquid crystal displays.

Further, when the display device includes three or more liquid crystal displays, for example, the voltage values applied to the scanning lines and the video lines of the liquid crystal displays are set such that a liquid crystal display located farther away from the viewer has larger voltage values. That is, the voltage values applied to the scanning lines and the video lines of three liquid crystal displays are set such that a liquid crystal display disposed on a side nearer to the viewer has smaller voltage values and a liquid crystal display disposed at a position farther away from the viewer has larger voltage values.

Order information of colors of LEDs included in the control signal for driving the LED drive circuit 500 is generated so as to be different from order information of colors included in the control signal for driving the LED drive circuit 300. For example, when the color information included in the front image signal SG1 and the rear image signal SG2 is a red LED, a green LED, and a blue LED (that is, a white display image is to be displayed), each of the front image control circuit 11 and the rear image control circuit 12 generates a control signal for turning on the red LED, the green LED, and the blue LED once in one frame. Here, when the front image control circuit 11 generates a control signal for turning on the LEDs in an order of "a red LED, a green LED, and a blue LED", the rear image control circuit 12 generates a control signal including order information of colors for turning on the LEDs in an different order such as "a blue LED, a red LED, and a green LED".

The memory (not illustrated) includes, for example, a random access memory (RAM) as a work memory used when executing various types of processing of the control circuit board 100d, and a read only memory (ROM) that stores data and a program defining operations of the control circuit board 100. Data or information generated or acquired by the control circuit board 100 is temporarily stored in the RAM. A program defining operations of the control circuit board 100 is written in the ROM.

The front display 200 is, for example, a transparent display including PDLC or the like, or a transmissive display having a predetermined transmittance. The front display 200 displays a sub display image (color) by light emission of LEDs of a plurality of colors arranged at a lateral side. The front display 200 includes the scanning line drive circuit 20, the video line drive circuit 21, and the front panel 22.

The scanning line drive circuit 20 applies a predetermined voltage to each of the scanning lines 20A based on information on an application voltage value that is included in the control signal output from the front image control circuit 11 and that is to be applied to each of the scanning lines 20A.

The video line drive circuit 21 applies a predetermined voltage to each of the video lines 21A based on information of an application voltage value that is included in the control signal output from the front image control circuit 11 and that is to be applied to each of the video lines 21A.

The front panel 22 includes PDLC between each of the plurality of scanning lines and each of the plurality of video lines 21A. In the front panel 22, when a voltage is applied to a predetermined scanning line 20A by the scanning line drive circuit 20 and to a predetermined video line 21A by the video line drive circuit 21 (that is, to a predetermined pixel), the alignment direction of the liquid crystal molecules of the PDLC in a region corresponding to the predetermined pixel changes based on the magnitude of the applied voltage, and as a result, a refractive index of the liquid crystal molecules of the PDLC in the region corresponding to the predetermined pixel changes. Accordingly, in the front display 200, a state of the front panel 22 can be freely controlled from a scattering state to a transparent state according to a relationship between the refractive index of the liquid crystal molecules of the PDLC and a refractive index of the polymer material. As the applied voltage increases, a difference between the refractive index of the liquid crystal molecules of the PDLC and the refractive index of the polymer material increases, light incident from the light source 30 is scattered at an interface between the liquid crystal molecules and the polymer material, and the luminance of the sub display image (color) displayed by the front panel 22 increases. Hereinafter, a change in a path of light incident from the light source 30 according to a change in the refractive index of the liquid crystal molecules of the PDLC will be described.

When no voltage is applied and the difference between the refractive index of the liquid crystal molecules and the refractive index of the polymer material is small, the light incident from the light source 30 transmits through the interface between the liquid crystal molecules and the polymer material without being scattered thereat, and passes between each of the plurality of scanning lines 20A and each of the plurality of video lines 21A while being totally reflected by surfaces of the two sheets of glass arranged so as to sandwich the PDLC like an optical fiber, for example. Therefore, the light incident from the light source 30 is not diffused to the outside of the front panel 22. That is, the front panel 22 does not display a sub display image (color) in a region corresponding to a pixel to which no voltage is applied in the front panel 22.

In addition, in the front panel 22, when a voltage is applied to a predetermined pixel, the alignment direction of the liquid crystal molecules changes, and the difference between the refractive index of the liquid crystal molecules and the refractive index of the polymer material is increased. When the difference between the refractive index of the liquid crystal molecules and the refractive index of the polymer material is large, the light incident from the light source 30 is scattered at the interface between the liquid crystal molecules and the polymer material, and is scattered toward the outside of the front panel 22. Accordingly, the front panel 22 can diffuse light of LEDs toward the outside of the front panel 22 only in the predetermined pixel to which the voltage is applied, and can display a sub display image (color).

The LED drive circuit 300 executes control of turning on or turning off LEDs of a predetermined color, based on the color information included in the control signal output from the front image control circuit 11. The number of sub-frames for executing turning-on control of LEDs set in the LED drive circuit 300 is set to be the same as the number of colors of LEDs provided in the light source 30. For example, in a case where the light source 30 includes LEDs of three colors as illustrated in FIG. 1, the number of sub-frames is three.

Figure 2:
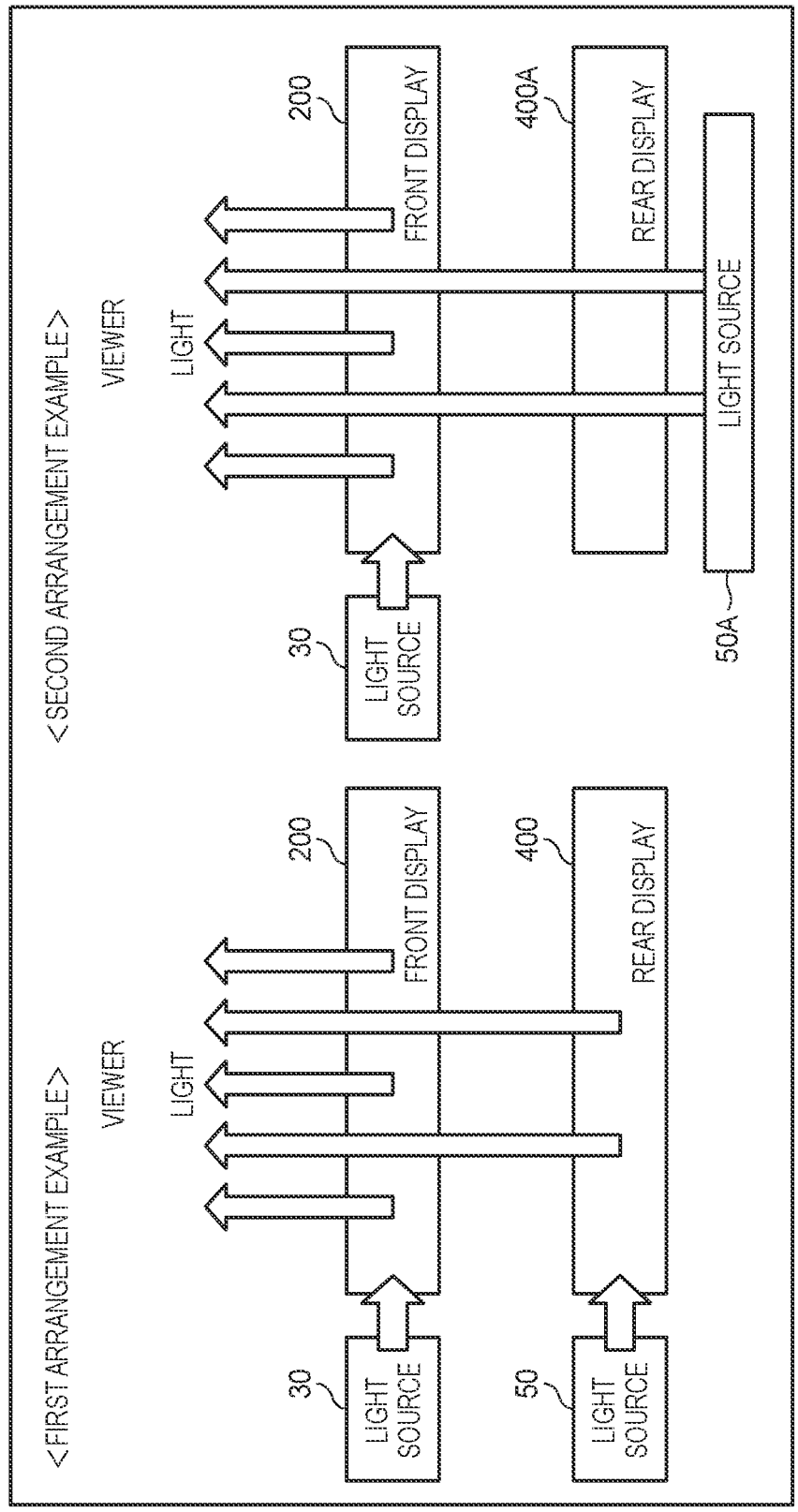
FIG. 2 is a diagram illustrating a first arrangement example and a second arrangement example of a light source according to the embodiment.

For example, the light source 30 is capable of emitting light of a plurality of colors of a red LED 30R, a green LED 30G, and a blue LED 30B, and is provided at a lateral side of the front panel 22 (see FIG. 2). The light source 30 is controlled by the LED drive circuit 300 to turn on or turn off LEDs of a predetermined color. The light source 30 illustrated in FIG. 1 includes LEDs of three colors, and may alternatively include LEDs of four or more colors.

The rear display 400 is, for example, a transparent display including PDLC or the like, or a transmissive display having a predetermined transmittance. The rear display 400 displays a sub display image (color) by light emission of LEDs of a plurality of colors arranged at a lateral side. The rear display 400 includes the scanning line drive circuit 40, the video line drive circuit 41, and the rear panel 42.

The scanning line drive circuit 40 applies a predetermined voltage to each of the scanning lines 40A based on information on an application voltage value that is included in the control signal output from the rear image control circuit 12 and that is to be applied to each of the scanning lines 40A.

The video line drive circuit 41 applies a predetermined voltage to each of the video lines 41A based on information of an application voltage value that is included in the control signal output from the rear image control circuit 12 and that is to be applied to each of the video lines 41A.

The rear panel 42 includes PDLC between each of the plurality of scanning lines and each of the plurality of video lines 41A. In the rear panel 42, when a voltage is applied to a predetermined scanning line 40A by the scanning line drive circuit 40 and to a predetermined video line 41A by the video line drive circuit 41 (that is, to a predetermined pixel), the alignment direction of the liquid crystal molecules of the PDLC in a region corresponding to the predetermined pixel changes based on the magnitude of the applied voltage, and as a result, a refractive index of the liquid crystal molecules of the PDLC in the region corresponding to the predetermined pixel changes. Accordingly, in the rear display 400, a state of the rear panel 42 can be freely controlled from a scattering state to a transparent state according to the relationship between the refractive index of the liquid crystal molecules of the PDLC and the refractive index of the polymer material. As the applied voltage increases, a difference between the refractive index of the liquid crystal molecules of the PDLC and the refractive index of the polymer material increases, light incident from the light source 50 is scattered at an interface between the liquid crystal molecules and the polymer material, and the luminance of the sub display image (color) displayed by the rear panel 42 increases. Hereinafter, a change in a path of light incident from the light source 50 according to a change in the refractive index of the liquid crystal molecules of the PDLC will be described.

When no voltage is applied and the difference between the refractive index of the liquid crystal molecules and the refractive index of the polymer material is small, the light incident from the light source 50 transmits through the interface between the liquid crystal molecules and the polymer material without being scattered thereat, and passes between each of the plurality of scanning lines 40A and each of the plurality of video lines 41A while being totally reflected by surfaces of the two sheets of glass arranged so as to sandwich the PDLC like an optical fiber, for example. Therefore, the light incident from the light source 50 is not diffused to the outside of the rear panel 42. That is, the rear display 400 does not display a sub display image (color) in a region corresponding to a pixel to which no voltage is applied in the rear panel 42.

In addition, in the rear display 400, when a voltage is applied to a predetermined pixel, the alignment direction of the liquid crystal molecules changes, and the difference between the refractive index of the liquid crystal molecules and the refractive index of the polymer material is increased. When the difference between the refractive index of the liquid crystal molecules and the refractive index of the polymer material is large, the light incident from the light source 50 is scattered at the interface between the liquid crystal molecules and the polymer material, and is scattered toward the outside of the rear panel 42. Accordingly, the rear display 400 can diffuse light of LEDs toward the outside of the rear panel 42 only in the predetermined pixel to which the voltage is applied, and can display a sub display image (color).

The LED drive circuit 500 executes control of turning on or turning off LEDs of a predetermined color, based on color information included in the control signal output from the rear image control circuit 12. The number of sub-frames for executing turning-on control of LEDs set in the LED drive circuit 500 is set to be the same as the number of colors of LEDs provided in the light source 50. For example, in a case where the light source 50 includes LEDs of three colors as illustrated in FIG. 1, the number of sub-frames is three.

For example, the light source 50 is capable of emitting light of a plurality of colors of a red LED 50R, a green LED 50G, and a blue LED 50B, and is provided at a lateral side of the rear panel 42 (see FIG. 2). The light source 50 is controlled by the LED drive circuit 500 to turn on or turn off LEDs of a predetermined color. The light source 50 illustrated in FIG. 1 includes LEDs of three colors, and may alternatively include LEDs of four or more colors.

The rear display 400 illustrated in FIG. 1 may be a liquid crystal display in the related art that does not transmit light or has a low transmittance. A configuration of such a rear display will be described with reference to a second arrangement example illustrated in FIG. 2.

Arrangement examples of the light sources 30 and 50 will be described with reference to FIG. 2. FIG. 2 is a diagram illustrating a first arrangement example and a second arrangement example of the light sources 30 and 50 according to the embodiment.

The front display 200 and the rear display 400 in the first arrangement example are a transmissive display including the PDLC or a transparent display. In such a case, the light source 30 is provided at a lateral side of the front display 200. The light source 50 is provided at a lateral side of the rear display 400.

In the front display 200 and the rear display 400 in the first arrangement example, when a voltage is applied to a predetermined pixel through the scanning line 20A and the video line 21A, light scattered by the front display 200 and light scattered by the rear display 400 enter the eyes of a viewer as a plurality of sub display images. At this time, a sub display image (color) displayed on the front display 200 and a sub display image (color) displayed on the rear display 400 are superimposed and look like one single display image (stereoscopic image) to the viewer.

The front display 200 in the second arrangement example is, for example, a transmissive display including the PDLC or a transparent display. On the other hand, a rear display 400A is a liquid crystal display in the related art that does not transmit light or has a low transmittance, and includes a light source 50A at a rear surface (a side opposite to a side where the viewer is present) of the rear display 400A.

In the front display 200 in the second arrangement example scatters, when a voltage is applied to a predetermined pixel through the scanning line 20A and the video line 21A, light of a predetermined color incident from the light source 30 is scattered in an electric field direction (direction directed toward the viewer) and a direction opposite to the electric field direction.

The rear display 400A in the second arrangement example includes the light source at the rear surface. Here, the light source 50A includes LEDs of a plurality of colors (for example, a red LED, a green LED, and a blue LED). The light source 50A is controlled by the LED drive circuit 500. In the display device including three or more liquid crystal displays, two liquid crystal displays disposed at a front surface and the middle are implemented by a transmissive display including the PDLC or a transparent display, for example, and a liquid crystal display disposed at a rear surface is implemented by an FSC liquid crystal display in the related art that does not transmit light or has a low transmittance.

The light scattered by the front display 200 and the light scattered by the rear display 400A in the second arrangement example enter the eyes of a viewer as a plurality of sub display images. At this time, a sub display image (color) displayed on the front display 200 and a sub display image (color) displayed on the rear display 400A are superimposed and look like one single display image (stereoscopic image) to the viewer.

Figure 3:
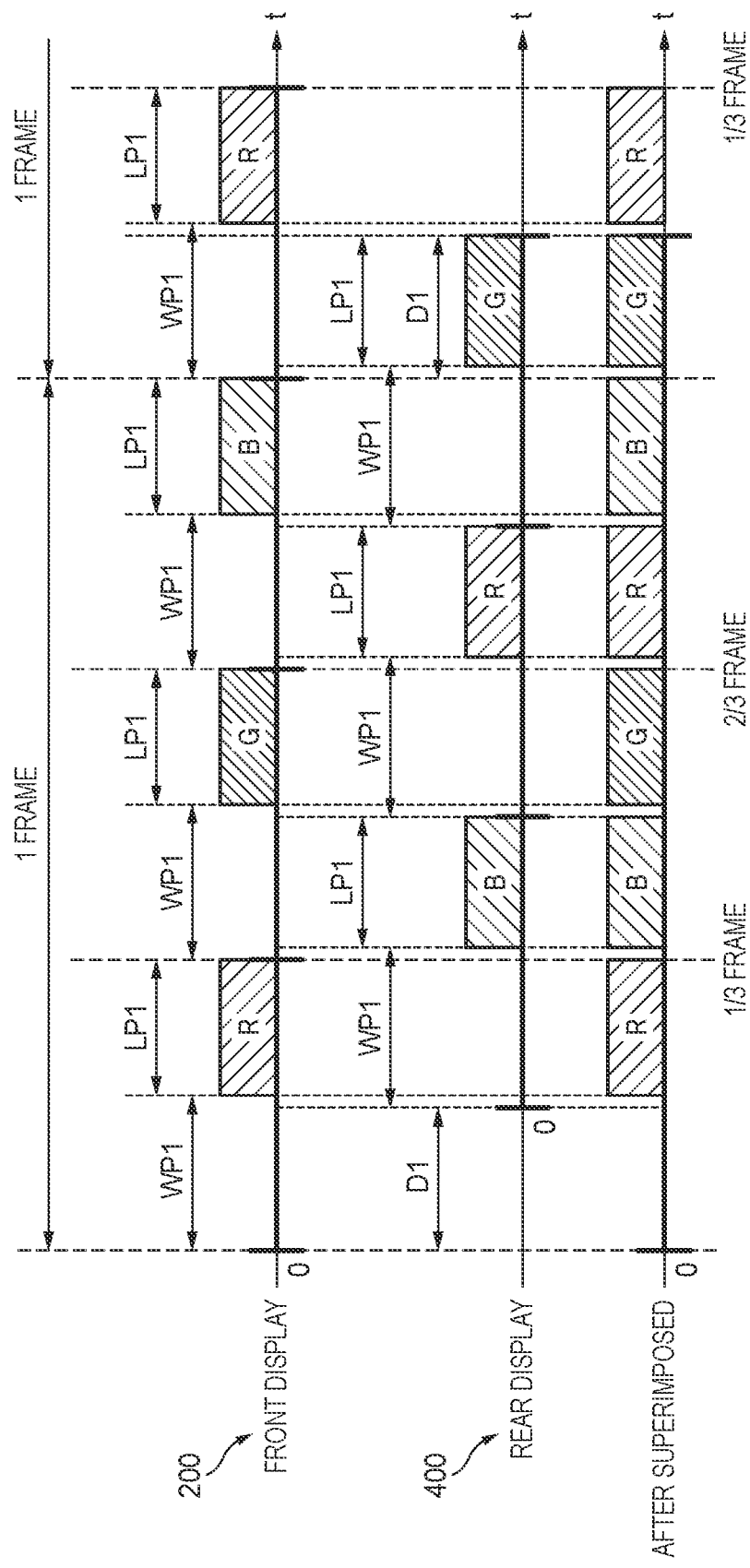
FIG. 3 is a diagram illustrating a first drive control example of the display device.

Next, a control example of various drive circuits that double a refresh rate of colors displayed by a display device including two liquid crystal displays will be described with reference to FIG. 3. FIG. 3 is a diagram illustrating a first drive control example of the display device. FIG. 3 illustrates an example in which the display device performs control to display a white display image (stereoscopic image).

Figure 4:
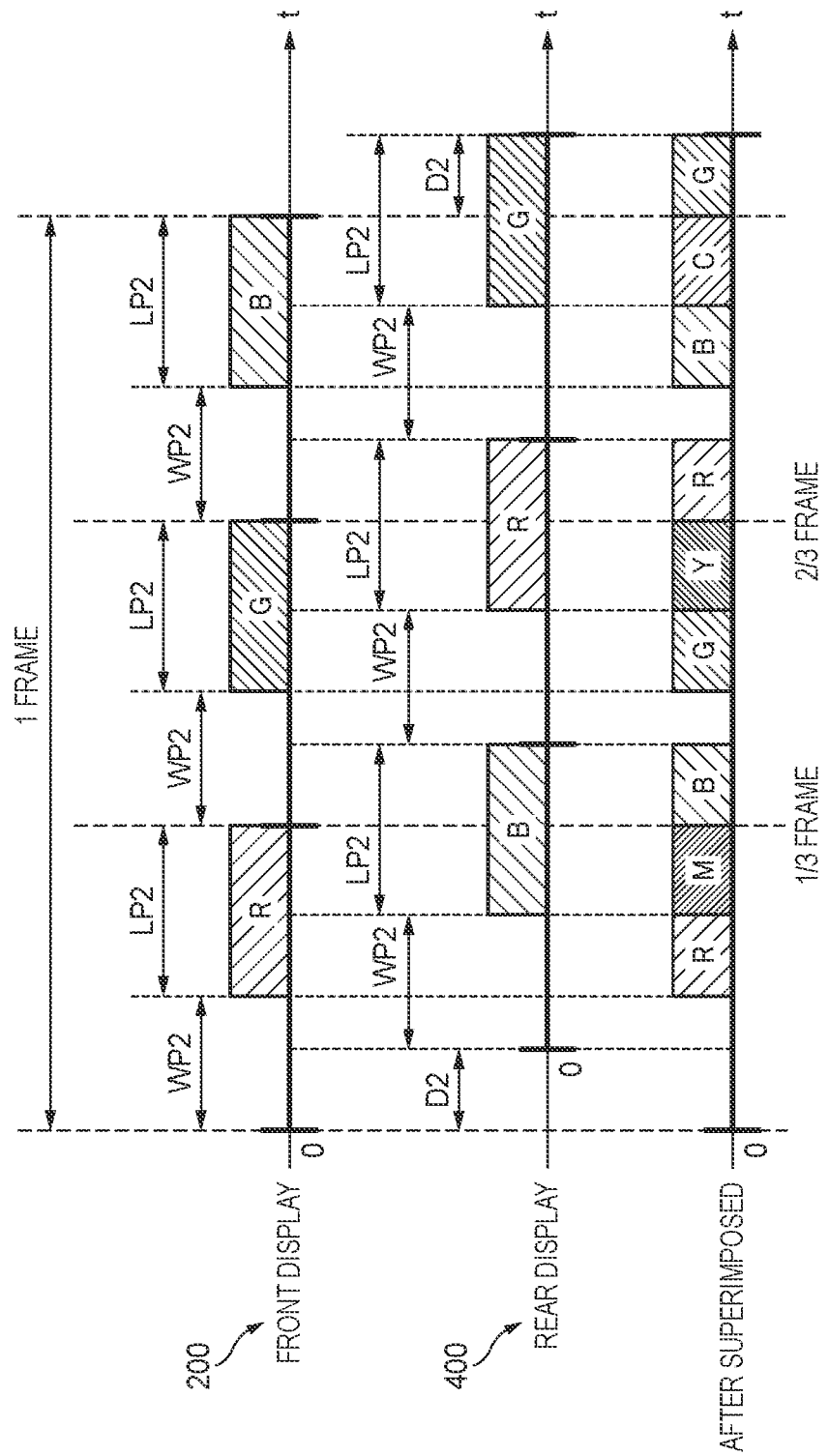
FIG. 4 is a diagram illustrating a second drive control example of the display device.
Figure 5:
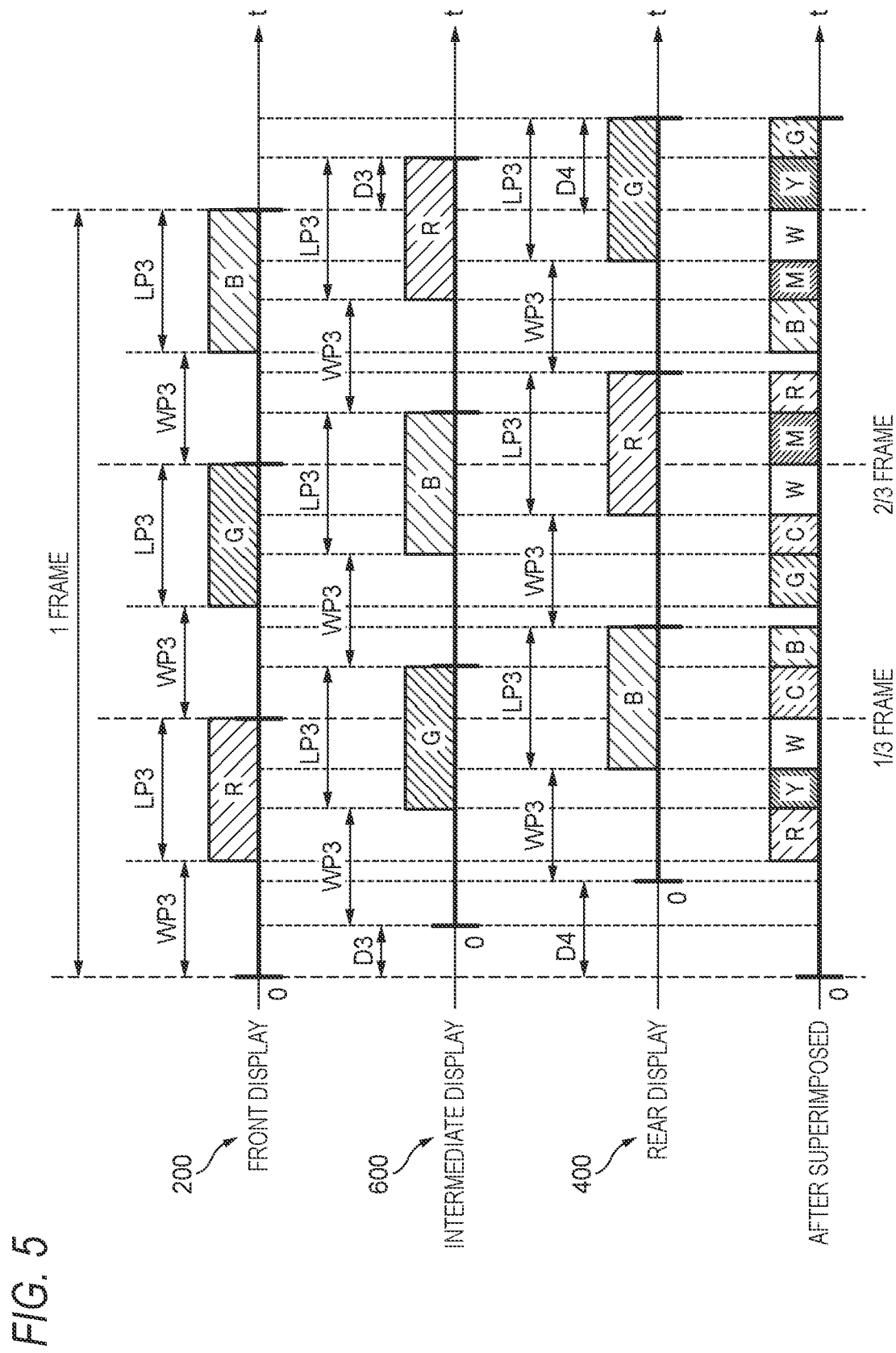
FIG. 5 is a diagram illustrating a third drive control example of the display device.

In order to make it easy to understand the difference from the number of times of switching of a sub display image (that is, color) by LED drive control methods illustrated in FIGS. 4 and 5, an example is illustrated in which each of a plurality of liquid crystal displays provided in display devices according to embodiments illustrated in FIGS. 3 to 5 has a refresh rate of 180 Hz. The number of sub display images displayed by the liquid crystal display in which the refresh rate is set to 180 Hz is three per frame. The sub-frame has a length of ⅓ of one frame.

In the front display 200, the scanning line drive circuit 20, the video line drive circuit 21, and the LED drive circuit 300 are driven such that the refresh rate is 180 Hz.

In the rear display 400, the scanning line drive circuit 40, the video line drive circuit 41, and the LED drive circuit 500 are driven such that the refresh rate is 180 Hz.

In the front display 200 illustrated in FIG. 3, the light source 30 turns on LEDs in an order of "the red LED 30R, the green LED 30G, and the blue LED 30B" for each sub-frame (⅓ frame). In the rear display 400, the light source 50 turns on LEDs in an order of "the blue LED 50B, the red LED 50R, and the green LED 50G" for each sub-frame (⅓ frame) that is an order of colors different from that in the front display 200. In the front display 200 and the rear display 400, control of applying a predetermined voltage to a predetermined pixel during a writing time WP1 to adjust the refractive index of the liquid crystal molecules of the PDLC, and scattering light of an LED of a predetermined color to a viewer side during a turning-on time LP1 to display a sub display image is repeatedly executed for sub-frames.

Here, a control signal input from the rear image control circuit 12 to the rear-side drive circuits is input at a timing delayed by a predetermined time D1 from an input timing of a control signal input from the front image control circuit 11 to the front-side drive circuits. Therefore, a start timing of each frame of the rear display 400 is delayed by the predetermined time D1 from a start timing of each frame of the front display 200. That is, the writing time WP1 and the turning-on time LP1 of the rear display 400 are controlled to be delayed by the predetermined time D1 from the writing time WP1 and the turning-on time LP1 of the front display 200, respectively. In the example illustrated in FIG. 3, the predetermined time D1 is set to a time equal to or greater than the turning-on time LP1 and equal to or less than the writing time WP1.

A display device including two liquid crystal displays displays, toward a viewer, a display image (color) obtained after sub display images (colors) displayed on the front display 200 and the rear display 400 respectively are superimposed. The display device illustrated in FIG. 3 can display the display image (color) toward the viewer in a manner of switching the display image (color) 6 times per frame (that is, 0.016 seconds). This is equal to the number of times of display at the time when a refresh rate of a liquid crystal display in a display device including one liquid crystal display is set to 120 Hz. That is, the display device illustrated in FIG. 3 can display the display image (color) at the same speed as in a case where the refresh rate is set to be doubled.

As described above, the display device according to the embodiment can increase the number of times of display of the display image displayed in a manner of superimposing the sub display images displayed by the respective liquid crystal displays in one frame, and can further reduce a display time of the same display image (that is, the same color) visually recognized by the eyes of the viewer. That is, since the display device according to the embodiment can shorten the display time of one display image (that is, the same color), it is possible to prevent color breakup of the display image (stereoscopic image).

Next, a control example of various drive circuits that triple a refresh rate of colors displayed by the display device including two liquid crystal displays will be described with reference to FIG. 4. FIG. 4 is a diagram illustrating a second drive control example of the display device. FIG. 4 illustrates an example in which the display device performs control to display a white display image (stereoscopic image).

In the front display 200 illustrated in FIG. 4, the light source 30 turns on LEDs in an order of "the red LED 30R, the green LED 30G, and the blue LED 30B" for each sub-frame (⅓ frame). In the rear display 400, the light source 50 turns on LEDs in an order of "the blue LED 50B, the red LED 50R, and the green LED 50G" for each sub-frame (⅓ frame) that is an order of colors different from that in the front display 200. In the front display 200 and the rear display 400, control of applying a predetermined voltage to a predetermined pixel during a writing time WP2 to adjust the refractive index of the liquid crystal molecules of the PDLC, and scattering light of an LED of a predetermined color to a viewer side during a turning-on time LP2 to display a sub display image is repeatedly executed for sub-frames.

In the example illustrated in FIG. 4, a control signal input from the rear image control circuit 12 to the rear-side drive circuits is input at a timing delayed by a predetermined time D2 from an input timing of a control signal input from the front image control circuit 11 to the front-side drive circuits. Therefore, a start timing of each frame of the rear display 400 is delayed by the predetermined time D2 from a start timing of each frame of the front display 200. That is, the writing time WP2 and the turning-on time LP2 of the rear display 400 are controlled to be delayed by the predetermined time D2 from the writing time WP2 and the turning-on time LP2 of the front display 200, respectively. In the example illustrated in FIG. 4, the predetermined time D2 is set to a time equal to or less than the writing time WP2 and equal to or less than the turning-on time LP2.

The display device including two liquid crystal displays displays, toward the viewer, a display image (color) obtained after sub display images (colors) displayed on the front display 200 and the rear display 400 respectively are superimposed. The display device illustrated in FIG. 4 can display the display image (color) toward the viewer in a manner of switching the display image (color) 9 times per frame (that is, 0.016 seconds). This is equal to the number of times of display at the time when the refresh rate of the liquid crystal display is set to 540 Hz. That is, the display device illustrated in FIG. 4 can display the display image (color) at the same speed as in a case where the refresh rate is set to be tripled.

As described above, the display device according to the embodiment can increase the number of times of display of the display image displayed in a manner of superimposing the sub display images displayed by the respective liquid crystal displays in one frame, and can further reduce a display time of the same display image (that is, the same color) visually recognized by the eyes of the viewer. That is, since the display device according to the embodiment can shorten the display time of one display image (that is, the same color), it is possible to prevent color breakup of the display image (stereoscopic image).

Next, a control example of various drive circuits that quintuple a refresh rate of colors displayed by a display device including three liquid crystal displays will be described with reference to FIG. 5. FIG. 5 is a diagram illustrating a third drive control example of the display device. FIG. 5 illustrates an example in which the display device performs control to display a white display image (color).

An intermediate display 600 is a liquid crystal display having the same configuration as that of the front display 200, and is, for example, a transparent display including PDLC or the like, or a transmissive display having a predetermined transmittance. In the intermediate display 600, various drive circuits (not illustrated) are driven such that a refresh rate is 180 Hz.

In the example illustrated in FIG. 5, a control signal input from an image control circuit (not illustrated) for the intermediate display to the various drive circuits is input at a timing delayed by a predetermined time D3 from an input timing of a control signal input from the front image control circuit 11 to the front-side drive circuits. Therefore, a start timing of each frame of the intermediate display 600 is delayed by the predetermined time D3 from a start timing of each frame of the front display 200.

A control signal input from the rear image control circuit 12 to the rear-side drive circuits is input at a timing delayed by a predetermined time D4 from the input timing of the control signal input from the front image control circuit 11 to the front-side drive circuits. Therefore, a start timing of each frame of the rear display 400 is delayed by the predetermined time D4 from the start timing of each frame of the front display 200. That is, a writing time WP3 and a turning-on time LP3 of the rear display 400 are controlled to be delayed by the predetermined time D4 from the writing time WP3 and the turning-on time LP3 of the front display 200, respectively.

The predetermined time D3 and the predetermined time D4 are set to be equal to or less than the writing time WP3 and to be different from each other.

In the front display 200 illustrated in FIG. 5, the light source 30 turns on LEDs in an order of "the red LED 30R, the green LED 30G, and the blue LED 30B" for each sub-frame (⅓ frame). In the intermediate display 600, the light source 30 turns on LEDs in an order of "a green LED, a blue LED, and a red LED" for each sub-frame (⅓ frame). The light source 50 turns on LEDs in an order of colors different from those of the front display 200 and the rear display 400. In the rear display 400, the light source 50 turns on LEDs in an order of "the blue LED 50B, the red LED 50R, and the green LED 50G" for each sub-frame (⅓ frame) that is an order of colors different from those in the front display 200 and the intermediate display 600. In the front display 200, the intermediate display 600, and the rear display 400, control of applying a predetermined voltage to a predetermined pixel during the writing time WP3 to adjust the refractive index of the liquid crystal molecules of the PDLC, and scattering light of an LED of a predetermined color to a viewer side during the turning-on time LP3 to display a sub display image is repeatedly executed for sub-frames.

The display device including three liquid crystal displays displays, toward the viewer, a display image (color) obtained after sub display images (colors) displayed on the front display 200, the intermediate display 600 and the rear display 400 respectively are superimposed. The display device illustrated in FIG. 5 can display the display image (color) toward the viewer in a manner of switching the display image (color) 15 times per frame (that is, 0.016 seconds). This is equal to the number of times of display at the time when the refresh rate of the liquid crystal display is set to 900 Hz. That is, the display device illustrated in FIG. 5 can display the display image (that is, switch the color) at the same speed as in a case where the refresh rate is set to be quintupled.

As described above, the display device according to the embodiment can increase the number of times of display of the display image displayed in a manner of superimposing the sub display images displayed by the respective liquid crystal displays in one frame, and can further reduce a display time of the same display image (that is, the same color) visually recognized by the viewer. That is, since the display device according to the embodiment can shorten the display time of one display image (that is, the same color), it is possible to prevent color breakup of the display image (stereoscopic image).

Although control in a case where a white display image is displayed has been described as an example in the present embodiment, the present invention is not limited thereto. For example, when displaying a yellow display image, the display device may control the red LED and the green LED as described above.

As described above, a display device according to an embodiment includes n (n being an integer equal to or greater than 2) number of liquid crystal displays (for example, the front display 200 and the rear display 400 illustrated in FIG. 1 when n=2), a light source that is provided for each liquid crystal display and is capable of emitting light of a plurality of different colors, and the control circuit board 100 that causes each light source to emit light of different colors based on an input signal (for example, the front image signal SG1 and the rear image signal SG2 illustrated in FIG. 1 when n=2) including color information on a display image to be displayed on each liquid crystal display such that light emission start timings of the light sources provided for the liquid crystal displays are different from each other. The light sources referred to here are, for example, the light source 30 for the front display 200 and the light source 50 (the light source 50A in the case of the second arrangement example illustrated in FIG. 2) for the rear display 400.

Accordingly, the display device according to the embodiment can increase the number of times of switching of colors displayed in one frame while preventing a decrease in luminance of a sub display image displayed by a plurality of liquid crystal displays that are driven using a field sequential color system. Therefore, since the display device can shorten a display time of the same display image (that is, the same color) to a time that is not sufficient for visual recognition processing of a viewer, it is difficult for the viewer to recognize the switching of the display image (color) for each sub-frame of each liquid crystal display, and it is possible to prevent color breakup of the display image (stereoscopic image) visually recognized by the viewer.

As described above, the control circuit board 100 in the display device according to the embodiment generates, for each light source, order information of a color of light to be emitted in each of a plurality of sub-frames obtained by dividing one frame of the display image according to the number of colors of light that is able to be emitted by the light source corresponding to each liquid crystal display, based on the input signal (in the case of n=2, the front image signal SG1 and the rear image signal SG2 illustrated in FIG. 1), and individually causes the light source to emit light based on the order information. Accordingly, when a plurality of colors (for example, red, green, and blue) necessary for displaying color information (for example, white) included in the input signal are turned on, the display device according to the embodiment can display sub display images of different colors on the plurality of liquid crystal displays in each of the plurality of sub-frames such that the light emission start timings are different. Therefore, the display device can increase the number of times of display (the number of times of color switching) of the display image (color) displayed in a manner of superimposing sub display images (colors) displayed by the plurality of liquid crystal displays respectively.

As described above, in each of the plurality of sub-frames, the control circuit board 100 in the display device according to the embodiment causes the light source provided in at least one liquid crystal display other than a first liquid crystal display to emit light with a delay of a predetermined time from the light emission start timing of the light source (for example, the light source 30 provided in the front display 200 in the example illustrated in FIG. 1) provided in the liquid crystal display disposed at a foremost surface on a viewer side among the plurality of liquid crystal displays. Accordingly, the display device according to the embodiment can display another display image (color), which is obtained by superimposing respective sub display images (colors) displayed by the plurality of liquid crystal displays, in the predetermined time shifted from a light emission timing, and thus can increase the number of times of display of the display image (color) (that is, the number of times of color switching) in one frame.

As described above, the control circuit board 100 in the display device according to the embodiment delays the light emission start timing of each of the other liquid crystal displays by a predetermined time equal to or less than a writing time (an example of a display preparation time) of the light source of the liquid crystal display disposed at the foremost surface (for example, the light source 30 provided in the front display 200 in the example illustrated in FIG. 1). Accordingly, in the display device according to the embodiment, an occurrence can be prevented that, when a different color is to be displayed in a next frame based on a next input signal, a display image (stereoscopic image) of a color different from a color indicated by the input signal is displayed by superimposing a sub display image (color) of the liquid crystal display at the foremost surface whose light emission start timing is the earliest and a sub display image (color) of another liquid crystal display whose light emission start timing is the latest.

As described above, the control circuit board 100 in the display device according to the embodiment delays the light emission start timing of each of the other liquid crystal displays by a predetermined time equal to or greater than a turning-on time (an example of a light emission time) of the light source provided in the liquid crystal display disposed at the foremost surface (for example, the light source 30 provided in the front display 200 in the example illustrated in FIG. 1). Accordingly, the display device according to the embodiment can increase the number of times of display (the number of times of color switching) of the display image (color) obtained by superimposing the respective sub display images (colors) displayed by the plurality of liquid crystal displays.

Specifically, when the display device includes two liquid crystal displays as illustrated in FIG. 3, the display device can display a stereoscopic image (color) at the same speed as in a case where a refresh rate in one frame is set to be doubled, and can double the number of times of display (the number of times of color switching) thereof As described above, the control circuit board 100 in the display device according to the embodiment delays the light emission start timing of each of the other liquid crystal displays by a predetermined time less than a turning-on time (an example of a light emission time) of the light source provided in the liquid crystal display disposed at the foremost surface (for example, the light source 30 provided in the front display 200 in the example illustrated in FIG. 1). Accordingly, the display device according to the embodiment can increase the number of times of display (that is, the number of times of color switching) of the display image (color) obtained by superimposing the respective sub display images (colors) displayed by the plurality of liquid crystal displays.

Specifically, when the display device includes two liquid crystal displays as illustrated in FIG. 4, the display device can display a stereoscopic image (color) at the same speed as in a case where a refresh rate in one frame is set to be tripled, and can triple the number of times of switching of colors to be displayed. In addition, when the display device includes three liquid crystal displays as illustrated in FIG. 5, the display device can display a display image at the same speed as in a case where a refresh rate in one frame is set to be quintupled, and can quintuple the number of times of display (that is, the number of times of color switching).

As described above, the liquid crystal display disposed at the foremost surface in the display device according to the embodiment is a transparent display. Accordingly, the display device according to the embodiment can transmit light of the light source of the liquid crystal display disposed at a rear surface side, and display a display image (stereoscopic image) by superimposing the respective sub display images of the plurality of liquid crystal displays.

As described above, the control circuit board 100 in the display device according to the embodiment controls an applied voltage so that a voltage applied to the liquid crystal display disposed at a rear surface side is larger than a voltage applied to the liquid crystal display disposed at a front surface side. Accordingly, the display device according to the embodiment can adjust a difference between luminance of a sub display image of the liquid crystal display disposed at the foremost surface and luminance of a sub display image of the liquid crystal display disposed at a rearmost surface to be small while preventing a decrease in luminance of a sub display image displayed by the liquid crystal display disposed at the rear surface side.

As described above, the light source (for example, the light source 30 provided at the front display 200 in the example illustrated in FIG. 1) corresponding to the liquid crystal display disposed at a foremost surface in the display device according to the embodiment is disposed at a side surface side of the liquid crystal display. Accordingly, the display device according to the embodiment can transmit light of the light source of the liquid crystal display disposed at a rear surface side, and display a display image (stereoscopic image) by superimposing the respective sub display images of the plurality of liquid crystal displays.

As described above, the light source corresponding to the liquid crystal display (an example of an n-th liquid crystal display) disposed at a rearmost surface farthest from the liquid crystal display (an example of a first liquid crystal display) disposed at the foremost surface on the viewer side among the plurality of liquid crystal displays according to the embodiment is disposed at a rear surface side of the liquid crystal display disposed at the rearmost surface. Accordingly, the display device according to the embodiment can prevent a decrease in luminance of a display image (stereoscopic image) to be displayed and reduce color breakup of the display image (stereoscopic image).

Although various embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, the components in the embodiments described above may be freely combined without departing from the gist of the invention.

The present application is based on Japanese Patent Application No. 2020-116579 filed on Jul. 6, 2020, and the contents thereof are incorporated herein by reference.

Industrial Applicability

The present disclosure is useful as a display device and a display method capable of reducing color breakup of a display image displayed using a field sequential color system.

The invention claimed is:

1. A display device comprising:
   n number of liquid crystal displays, where n is an integer equal to or greater than 2;
   n number of light sources, each of the light sources being provided for a respective one of the liquid crystal displays and being capable of emitting light of a plurality of different colors; and
   a processor that causes the light sources to emit light of different colors based on, for each of the liquid crystal displays, an input signal including color information on a sub display image to be displayed on a corresponding one of the liquid crystal displays such that light emission start timings of the light sources provided for the liquid crystal displays are different from each other,
   wherein, for each adjacent pair of the liquid crystal displays, the processor causes a color of the light emitted from one of the light sources to be different from a color of the light emitted from another of the light sources when the one light source and the another light source are both emitting light, and causes the color of the light emitted from the one of the light sources starting at an emission start time of the one of the light sources to always be different from the color of the light emitted from the another of the light sources starting at a next emission start time of the another of the light sources after the emission start time of the one of the light sources.

2. The display device according to claim 1,
   wherein the processor generates, for each of the light sources, order information of a color of light to be emitted in each of a plurality of sub-frames obtained by dividing one frame of the sub display image according to a number of the plurality of colors of light that are able to be emitted by the light source corresponding to each of the liquid crystal displays, based on the input signal, and individually causes the light source to emit light based on the order information.

3. The display device according to claim 2,
   wherein in each of the plurality of sub-frames, the processor causes the light source provided in one of the liquid crystal displays other than a first liquid crystal display of the liquid crystal displays to emit light with a delay of a predetermined time from the light emission start timing of the light source provided in the first liquid crystal display, the first liquid crystal display being disposed at a foremost surface on a viewer side among the liquid crystal displays.

4. The display device according to claim 3,
   wherein the predetermined time is a time equal to or less than a display preparation time of the first liquid crystal display.

5. The display device according to claim 4,
   wherein the predetermined time is a time equal to or greater than a light emission time of the light source provided in the first liquid crystal display.

6. The display device according to claim 4,
   wherein the predetermined time is a time less than a light emission time of the light source provided in the first liquid crystal display.

7. The display device according to claim 3,
   wherein the light source corresponding to the first liquid crystal display is provided at a side surface side of the first liquid crystal display.

8. The display device according to claim 1,
   wherein a first liquid crystal display disposed at a foremost surface on a viewer side among the liquid crystal displays is a transparent display.

9. The display device according to claim 1,
   wherein the processor controls an applied voltage so that a voltage applied to one of the liquid crystal displays disposed at a rear surface side is larger than a voltage applied to another of the liquid crystal displays disposed at a front surface side.

10. The display device according to claim 1,
    wherein in a case that one of the liquid crystal displays disposed at a foremost surface on a viewer side among the liquid crystal displays is set as a first liquid crystal display, the light source corresponding to an n-th liquid crystal display disposed at a rearmost surface farthest from the first liquid crystal display is disposed at a rear surface side of the n-th liquid crystal display.

11. A display method comprising:
    acquiring, for each of n number of liquid crystal displays, an input signal including color information on a sub display image to be individually displayed on a corresponding one of the liquid crystal displays, where n is an integer equal to or greater than 2; and
    causing n number of light sources, each of the light sources being provided for a respective one of the liquid crystal displays and being capable of emitting light of a plurality of different colors, to emit light of different colors based on the color information such that light emission start timings of the light sources provided for the liquid crystal displays are different from each other,
    wherein the causing comprises, for each adjacent pair of the liquid crystal displays, causing a color of the light emitted from one of the light sources to be different from a color of the light emitted from another of the light sources when the one light source and the another light source are both emitting light, and causing the color of the light emitted from the one of the light sources starting at an emission start time of the one of the light sources to always be different from the color of the light emitted from the another of the light sources starting at a next emission start time of the another of the light sources after the emission start time of the one of the light sources.

* * * * *